Figure 1:
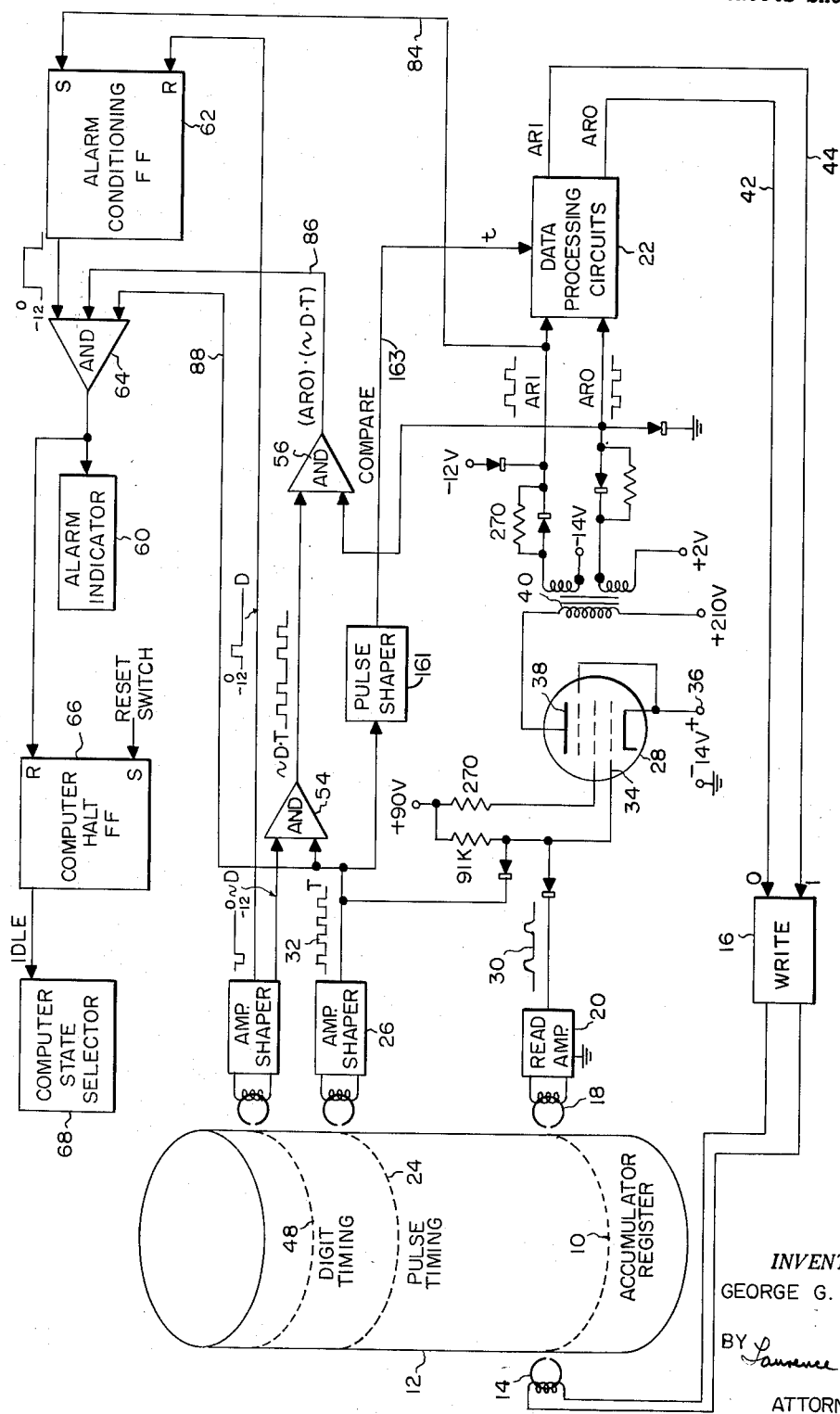

April 25, 1961　　　G. G. HOBERG　　　2,981,937
RELIABILITY CHECKING CIRCUITS
Filed May 28, 1956　　　　　　　　　2 Sheets-Sheet 2
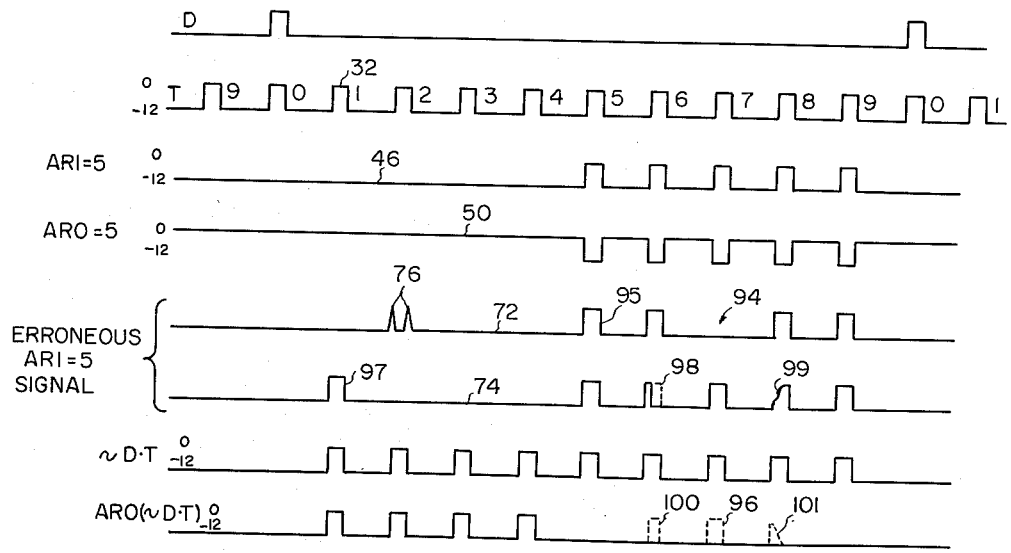
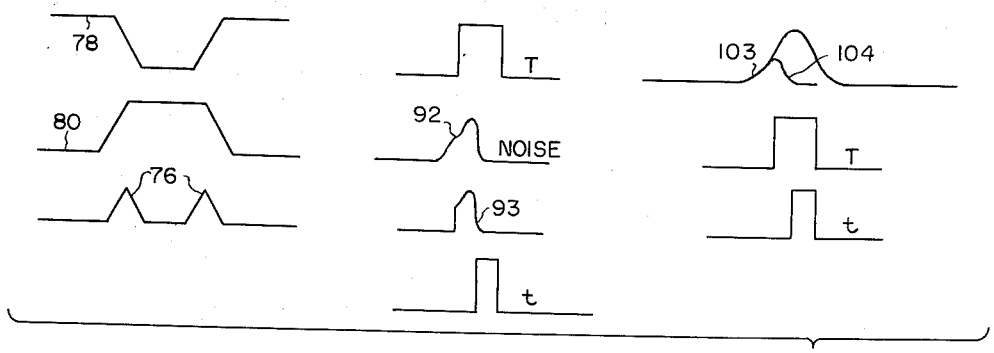
*Fig. 2*
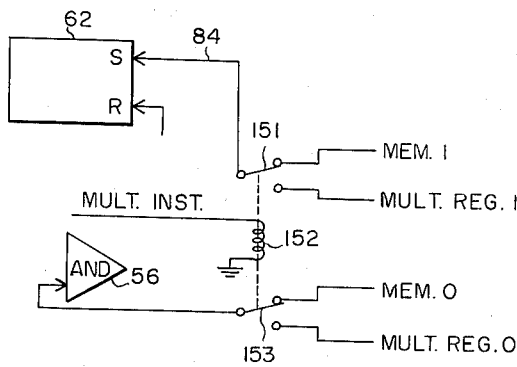
*Fig. 3*
INVENTOR.
GEORGE G. HOBERG
BY
Lawrence R. Brown
ATTORNEY

United States Patent Office 2,981,937
Patented Apr. 25, 1961

2,981,937
RELIABILITY CHECKING CIRCUITS

George G. Hoberg, Berwyn, Pa., assignor to Burroughs Corporation, Detroit, Mich., a corporation of Michigan Filed May 28, 1956, Ser. No. 587,515

11 Claims. (Cl. 340—213)

This invention relates to signal processing circuits, and more particularly it relates to circuits for indicating the presence of spurious signals.

In signal processing circuits such as this, used in electronic digital computers, signals are presented in the form of individual pulses. As these pulses are passed from circuit to circuit, they are subject to interspersed noise pulses and distortion in the form of change in pulse shape, duration or amplitude, or delay in time. Accordingly, if signals are processed over and over again, such as occurs in electronic computer systems during accumulation, precautions must be taken to prevent erroneous calculations which might be caused due to the presence of a spurious signal pulse or omission of a signal pulse with the result that the data processing circuits do not operate in the proper manner. Thus, alarm circuits are incorporated in electronic computers for detecting the presence of pulses which cause improper computer operation. These alarm circuits generally give an indication of an error and serve to halt the current computer operation. Prior art alarm circuits, however, have either been complex in operation and expensive because of the requirement of storing a special checking code pulse in addition to the required data. Some systems have also required auxiliary memory circuits for storing a large number of digit pulses which are to be compared to those pulses arriving at a different circuit position, or they have been limited to a special type of spurious pulse checking and have not been acceptable in preventing a variety of types of computer errors. Thus an alarm indication circuit should be able to detect the following kinds of erroneous signals:

(1) Spurious noise pulses appearing between clock pulse periods,
(2) Extra pulses which appear in pulse spaces not normally containing pulses,
(3) Misshapen or distorted pulse wave shapes, and
(4) Pulses of abnormal time duration,
(5) Attenuated or missing pulses.

In general, it is desirable to produce an alarm circuit for checking the reliability of computer operation which is more sensitive than the general computer data processing circuits. In this manner, the alarm circuit will be able to indicate those spurious signals which indicate that abnormal operation is taking place in a system before it becomes so faulty as to cause continuous computation errors.

It is, therefore, an object of the invention to improve reliability checking circuits which are capable of producing alarm indications in response to detection of erroneous signals which indicate a possible computation error.

Another object of the invention is to produce simple equipment for detecting spurious signals of many different types.

A further object of the invention is to provide alarm indication circuits which do not require the storage of signals which are being checked.

A still further object of the invention is to provide checking circuits operable from data information without requiring additional check digits.

A further object of the invention is to provide means for signalling the departure from consecutive presentation of a group of pulses presented in pulse coded form.

In accordance with the invention, therefore, information items such as numbers are presented in pulse count code form wherein each information item has a single group of consecutively presented pulses. In this manner, the code has a redundant characteristic in that the time period between the first and last pulse will specify the item, as well as the number of pulses. This feature is utilized for providing an alarm indication so that it is not necessary to store the items being checked in special storage circuits used only for tthe purpose of alarm comparison.

Thus, in a computer circuit operable with information signals presented in the form of a series of consecutive pulses during a signal period defined by index marker pulses at the beginning and end of the period, the series of pulses expire at a consecutive pulse period, just before the presentation of the last index marker pulse. In these systems, the signal pulses are generally presented at specified clock marker pulse times and the index marker pulses arrive in a further clock marker time after the last signal pulse. Means is provided responsive to the first pulse occurring after the first index marker pulse in an information signal period, and this means is operable to enable a detection circuit for assuring that signal pulses occur for all clock marker pulse times remaining between the first detected pulse and last index marker pulse of the period. An alarm therefore occurs whenever a departure is signified from the consecutive pulse pattern between the first pulse of the period following the index marker pulse and the last index marker pulse.

The alarm indicator circuit therefore includes a single alarm conditioning bistable state flip-flop circuit which is made responsive to the first pulse of each information item. A simple "And" circuit is provided for detecting variations from the pulse count code following the first pulse to thereby establish a further alarm signal. The alarm, therefore, is operated as a function of coincident presence of both the alarm signal and the alarm conditioning signal.

In order to make the alarm circuit more sensitive than the data processing circuits, the alarm conditioning flip-flop circuit is prepared for producing an alarm conditioning signal at any time during the specified item period, whereas the data processing circuits are operable only when signal pulses arrive in coincidence with specified timing pulses interspersed throughout the item period. The alarm conditioning flip-flop receives a normal pulse during the specified item period while the data processing circuits, in addition to receiving normal information pulses, receive a modified clock pulse $t$ having a shorter duration and a later starting time than a normal clock pulse. Thereby, certain types of erroneous signals will cause an alarm indication before the data processing circuits are adversely responsive thereto.

Further objects and features of the invention will be described hereinafter in detail with reference to the accompanying drawings in which:

Figure 1 is a circuit diagram of an electronic data processing system incorporating the invention; and Figure 2 is a chart indicating a series of wave forms significant in the operation of the described system embodying the invention; and Fig. 3 is a partial schematic diagram of a further principle of operation of the invention.

In the electronic data processing system shown in Figure 1, the various electronic circuits are shown in block diagram form in order to more specifically indicate the nature and scope of the present invention, since the circuit details do not form part of the present invention and all of the circuits are well known in the electronic computer art. These circuits are found, for example, in the electronic computer described in the co-pending Hoberg et al. application for Electronic Computer System, Serial No. 492,062, filed March 4, 1955. In this co-pending application the details of each of the circuits shown in the block diagram form are described with particularity and portions of the computer system described therein are shown in simplified form in the view of Figure 1.

In an electronic computer of the type described, it is necessary to perform the fundamental accumulation operation. This results by providing a closed data processing loop, together with a storage register, so that numbers may be called from the register, merged with other numbers, and returned to the register.

As shown in Figure 1, the accumulator register comprises a track 10 upon the magnetic drum 12. Signals are recorded upon this track by the magnetic head 14 in either one of two magnetic polarities representing, respectively, the signal conditions "0" and "1" as directed by the write circuit 16. Those signals recorded upon the accumulator track 10 are read by the magnetic head 18 and amplified by the read amplifier 20. In order to assure that standard signals of exact time and shape are provided for operation of the data processing circuits 22, each pulse is timed with clock signals T derived from the pulse timing track 24 by the amplifier-shaper circuit 26. Thus, the pulse amplifier tube 28 receives input signals 30 and timing signals 32 at its input electrode 34, which overcome the cutoff bias at terminal 36 only in the event that both signals arrive in coincidence, thereby providing at the output electrode 38 shaped signals of specified time duration at exact clock pulse times. The pulse transformer 40 serves to provide signals of opposite polarities extending from a given reference potential of —12 volts which are designated as the signals AR1 and AR0 to indicate signals which are contained in the accumulator register together with the polarity indication thereof. These signals are used for performing various operations such as addition and counting in the data processing circuits 22, which provide at leads 42 and 44 respectively, signals for designating the writing of respective 0's and 1's on the accumulator register.

Each item of information in this system is presented in pulse count form in the manner shown by wave form 46 of Figure 2, which indicates the decimal number five. Each item period is located within a unit time period by digit marking pulses D written upon the magnetic drum track 48 which bracket the five pulses appearing in each information item. Each of the unit time periods have nine unit pulse periods $T_1$ through $T_9$ in which information pulses may or may not occur. A coded item of information comprises a pulse group of successive unit pulses wherein different items are identified by pulse groups of varying sizes. In each unit time period the groups of successive pulses in an information item include the last presented pulse period in the unit time period so that after a first information pulse is presented, successive pulses appear for each pulse time period during the remainder of the unit time period. Thus, the decimal digits 0–9 are designated by the respective number of pulses occurring between two successive digital timing pulses D. For example, as indicated in wave form 46 of Figure 2, the decimal 5 therefore is represented by the occurrence of the last five pulses at T pulse periods $T_5$ through $T_9$. Throughout the data processing circuits 22, these signals are detected by means of counters which count the number of pulses appearing in the signal. Therefore, the presence of spurious pulses, distorted pulses, or the absence of pulses, will cause errors in the data processing circuit operation. In order to detect the presence of such spurious pulses as will cause a possible error, the items are represented by a single group of consecutively presented pulses, where each pulse occurs in time coincidence with one of the timing pulses T.

In this manner, the first pulse of a period may be detected and an alarm signal may be generated whenever the signal wave form thereafter varies from the normal pulse count code. Because of the provision of the signal pulse of both amplitudes, as designated in wave forms 46 and 50, a comparison of the signals may be made with the timing pulses T in order to produce a signal signifying a variation from the desired pulse count code. Thus the signal $\sim D \cdot T$, a positive going pulse and shown in Figure 2, is developed by the "And" circuit 54 of Figure 1. This signal is similar to the undistorted normal appearance of the maximum number of pulses (9) which could appear in any selected decimal digit.

A further "And" circuit 56 is used for comparison of the negative or AR0 signals with the $\sim D \cdot T$ signal to result in a combined signal $(AR0) \cdot (\sim D \cdot T)$ (shown in Figure 2) which represents the variations from the normal pulse count code appearing in the signal pulse. This signal, which may be a positive or negative, is utilized to actuate an alarm indicator circuit 60, through the "And" gate 64, only when an alarm conditioning flip-flop circuit 62 is in its set condition. The alarm conditioning flip-flop 62 is placed in its "set" condition by receipt of the positive going AR1 signal over the conductor 84. While in its "set" condition, the alarm conditioning flip-flop 62 emits the positive going signal to the "And" gate 64. The "And" circuit 64 further requires the presence of a T clock pulse for operation which is developed at the amplifier shaper circuit 26 and applied to the "And" circuit 64 over the conductor 88.

In addition to an alarm indication at circuit 60, the entire data processing operation may be halted by means of a computer halt flip-flop circuit 66 which sends the computer into an inactive condition by pre-setting the state selector 68 into its idling state. The halt flip-flop 66 may be reset by a manual switch and the computer may thereafter be started in a normal manner after receipt of an alarm indication to determine whether the alarm signifies an intermittent spurious signal or a marginal error which was detected because of the provision as herein before mentioned, of making the alarm circuit more sensitive than the data process circuits 22 to the present spurious pulses.

In general, the various forms of spurious pulses which cause errors in the data processing circuits 22 are shown in wave forms 72 and 74 of Figure 2. Consider, for example, the presence of the extra pulses 76 which may arrive at least partially between the clock pulse periods T. These erroneous pulses may result, for example, by combining the two signals 78 and 80 of Figure 2 at an "And" gate. Because of the different wave shapes, the result is a provision of the two spurious noise spikes 76 which each arrive at a time occurring in between two successive T pulses.

By analysis of wave form 78 and 80 it may be seen that these spikes represent conditions caused by either too much pulse stretching of the wave form 80 or by not enough duration of the wave form 78. Either of these conditions are indicative of marginal component failures, such as a weak amplifier tube or increased circuit capacitance, which would result in possible intermittent computer operation whereby errors might creep into computations without being readily detected. Accordingly, the present alarm system is designed to detect this sort of extraneous pulse before the condition causes intermittent errors even though it does not appear at the normal clock pulse time T and therefore could not be detected in normal computer operation wherein each circuit is provided with a time comparison circuit to eliminate those noise signals which do not coincide with clock pulses T. Thus, note that the alarm conditioning flip-flop circuit 62 of Figure 1 is made responsive to pulses arriving at any time other than at the time of occurrence of the D pulses, and therefore the presence of any spurious signal spikes 76 occurring before the first digit pulse upon input lead 84 will cause the alarm conditioning flip-flop circuit 62 to be triggered into its set position. Thereafter until the next D pulse, the presence of any pulse at the output lead 86 of the "And" comparison circuit 56 which coincides with a T pulse at lead 88 will produce an alarm indication. Since the initial pulses of signal AR0·(~D·T) are present, it is seen that pulses coinciding with either clock pulse $T_2$ or $T_3$ will result in triggering the alarm circuit, depending upon which of the spikes 76 is successful in triggering the alarm conditioning flip-flop 62. In order that the alarm conditioning flip-flop 62 be made more sensitive than the data processing circuits 22 thereby causing the computer to halt before erroneous signals are processed by the data processing circuits 22, provision is made for the insertion into the data processing circuits 22 of a modified clock pulse $t$ instead of a normal clock pulse T which has a shorter duration and a later starting time than the clock pulse T. The modified clock pulse $t$ is shown in Figure 2. It is initiated from the amplifier shaper 26 and applied to the pulse shaper 161. The modified clock pulse $t$ is then applied to the data processing circuits 22 over the conductor 163. Thus, consider the noise pulse 92 of Figure 2 which may be similar to one of the spikes 76. This pulse may partially coincide with the timing pulse T, as indicated by wave form 93, but would be rejected in the data processing circuits 22 because the signals would be clocked against the modified or special clock pulses $t$, which have a shorter duration and a later starting time than the normal clock pulse T. This shorter duration limits the likelihood of coincidence of the special clock pulse $t$ which would accidentally operate the data processing circuits 22 if a clock pulse is present at the same time as some random noise at the input. Accordingly, the alarm conditioning circuit is therefore more sensitive than the data processing circuits with respect to operation from spurious pulses in order to prevent the possibility of erroneous calculations due to the presence of intermittent pulses caused by partial circuit component failure.

A further spurious signal condition which will trigger the alarm indicator circuit is represented in wave form 72 by the absence of a pulse at position 94. If this condition exists (neglecting the spikes 76), the first pulse of 95 of the information item will serve to set the alarm conditioning flip-flop 62. The comparison circuit 56 will therefore provide a pulse 96, indicating a variation from the normally required chain of timed pulses to thereby produce an alarm indication. In a manner similar to the operation with spurious pulses 76, the accidental provision of an extra pulse 97, such as shown in wave form 74, will cause operation of the alarm circuit by means of the next AR0·(~D·T) signal pulse occurring at clock pulse period $T_2$.

Further misshaped pulses, such as occurring at position 98 and 99, produce alarm signals 100 and 101 in the comparison wave form which likewise produce an alarm indication. While it is recognized that there are certain types of signals not resulting in an alarm in the presently described checking circuit, it is seen from the wave forms of Figure 2 that a comprehensive checking is accomplished of many different types of wave forms with very simple comparison checking circuits, as shown in Figure 1, which do not require the provision of extensive storage circuits or the retaining of a large number of pulses for later comparison at a different circuit position.

In providing for more sensitive operation of the alarm conditioning flip-flop circuit 62 with respect to spurious noise signal pulses than the data processing circuits 22, the condition specified by wave forms 103 of Figure 2 result in providing an alarm signal. The wave form 103 signifies the writing of a normal pulse upon the accumulator register track 10 and the wave form 104 signifies the incomplete erasure of this pulse by improper writing of another pulse thereover by the writing circuit 16, as might result by weakening of a write amplifier circuit. Thus, pulse 104, when read by the head 18 of Figure 1, will operate in the manner described for the noise pulse 92 to produce waveform similar to 93 which will cause the alarm conditioning flip-flop circuit 62 to be set, but which probably is not enough to cause an error in the data processing circuits 22 because of the employment of the modified timing pulse $t$. It is thereby seen that the provision of the unclocked flip-flop circuit 62 results in early indication of computer trouble before errors are made in calculations which would be difficult to otherwise detect.

In general several signal processing channels in the same computer may be checked by providing further similar checking circuits; however, it may not be economically feasible to employ several different error checking circuits. A single alarm circuit therefore may be operated optionally from that one of several different signal processing channels that might be most likely to contribute errors. A diagram of such a circuit is shown in Fig. 3. Here the alarm conditioning flip-flop 62 may be set by signals presented at lead 84 either from the computer memory or a multiplier register depending upon the position of the switch contacts 151. It may be assumed therefore that in the normally operated position the switch 151 is closed to provide setting of the alarm conditioning flip-flop 62 for signals derived from the computer memory section in use. However, during some computer operations the memory is not significantly used and thus the chance for error is greater in other signal processing circuits. For example, during multiplication, it is more desirable to check the multiplier register operation than the memory operation, since the multiplier register is in use for several different computer manipulations. Accordingly the relay 152 or other switch operating means is actuated by the multiply instruction taken from the computer program to permit the checking operation to take place on those signals specified by the current machine logic. The alarm signal circuit at the compare gate 56 is likewise modified by the switch section 153 produce the proper alarm circuit comparison.

The checking circuit of this invention therefore lends itself to operation in response to automatic computer programming so that the particular signal processing channel which is most likely to contribute errors with the current program may be checked.

It is clear, therefore, that there is provided, in accordance with this invention, an improved and simplified reliability checking circuit for electronic signal processing system. Having therefore described the nature and operation of the invention, those novel features believed descriptive of the scope of the invention are defined with particularity in the appended claims.

In the claims:

1. An electronic system reliability checking circuit comprising in combination, a source of timing pulses, means for presenting information items during specified time periods in pulse count form wherein each information item has a single group of consecutively presented pulses with each pulse occurring in time coincidence with one of the timing pulses, data processing circuits for manipulating said information items, means for comparing the manipulated information items with those ones of said timing pulses occurring during an item period to provide thereby a comparison signal indicative of differences in coincidence, means responsive to the first pulse occurring in an item period for producing an alarm conditioning signal for the remainder of the item period, and means responsive to coincidence of the comparison signal and the alarm conditioning signal for signalling a possible error.

2. A system as defined in claim 1 wherein the manipulated information items are reproduced in the form of two item signals having pulses presented in opposite polarities from a common reference potential; the means for comparing includes a gating circuit producing a resultant signal from the timing pulses occurring during an item period and the reproduced information items having pulses at polarity opposite to the timing pulses; and the means responsive to the first pulse comprises a bistable state flip-flop circuit responsive to one of the two said item signals for operation into that state producing the output alarm conditioning signal, and means for re-setting the flip-flop circuit to its other state between successive presentation of information items.

3. A system as defined in claim 1 wherein the data processing circuits include means for enabling response to only those information item pulses coincident with timing pulses, the means for signalling a possible error is responsive only to those comparison pulses coinciding with timing pulses, and the means responsive to the first item pulse is responsive to a first pulse occurring at any time during the item period.

4. An erroneous signal indication circuit for a system utilizing pulse count signals comprising in combination, a bistable circuit for producing an alarm conditioning signal at any time during a specified pulse count period, data processing circuits connected in a closed loop operable to reprocess signals over and over, storage means in said closed loop, means producing a first series of clock pulses, a pulse shaping circuit operable to permit passage of only such stored signals arriving in time coincidence with the clock pulses, means for producing further series of clock pulses, each being of shorter duration and of later starting time than the clock pulses of the first series, means for timing operation in the data processing circuits with the further series of clock pulses, and means for operating the bistable circuit in response to signals passed by said pulse shaping circuit, whereby the bistable circuit is made more sensitive to spurious signals than the data processing circuits.

5. In a computer apparatus employing a pulse code in which bits of information are indicated by the number of pulses contained in a unit time period, each of said unit time periods being comprised of the same predetermined number of unit pulse periods in which information pulses may or may not occur, the variation in the number of information pulses in a unit time period comprising a coded information item containing pulses occurring as successive unit pulse periods thereby to form pulse groups of varying lengths for different information items, the groups of successive pulses in an information item including the last presented pulse period in the unit time period, means developing marker pulses indicative of the start of said unit time periods, means developing timing pulses coincident with the said unit pulse periods within the said unit time periods, means deriving conditioning pulses coincident with the first information pulse, circuit means responsive to said marker pulses to establish a first condition therein and to said information pulses to establish a second condition therein, comparison means having inputs and an output, an input of said comparison means coupled to said timing pulse developing means, another input of said comparison means coupled to said means deriving conditioning pulses, said comparison means adapted to produce output pulses in response to pulses at its inputs and in periods in which information pulses are not coincidentally present, and a coincident circuit having a first input coupled to said circuit means whenever said second condition is established and a second input coupled to said comparison means output for developing an alarm pulse within said unit time period whenever coincidence of signals appears at both said inputs.

6. Apparatus as claimed in claim 5 in which the comparison means comprises means for compairng said timing pulses of one polarity with pulses of opposite polarity to produce under normal conditions zero pulse output in the unit pulse periods in which information pulses are present.

7. The combination is defined in claim 5 wherein said circuit means comprises a bistable flip-flop circuit.

8. A circuit comprising in combination, means generating serially presented coded information items, means generating marker pulses between said information items, a source of timing pulses, an alarm conditioning circuit having a first condition and a second condition, means responsive to said marker pulses for establishing said first condition in said alarm condition circuit, means responsive to said coded information items for establishing said second condition in said alarm conditioning circuit, comparison means responsive to said coded information items and said timing pulses which comparison means derives a signal indicative of a difference in condition in said information items and said timing pulses, a device coupled to said alarm conditioning circuit and said comparison means, actuated by said second condition from said alarm conditioning circuit and by said signal from said comparison means.

9. The combination as defined in claim 8 wherein said device comprises means to actuate an error warning circuit.

10. An alarm circuit for an electronic data processing system comprising in combination, a plurality of signal processing channels; an alarm indicator operable with information signals presented in the form of a series of consecutive pulses in a signal period defined by index marker pulses and arriving at specified clock times, the series of pulses expiring at a consecutive pulse period before presentation of the last index marker pulse, means responsive to the first pulse of an information signal period, means operable from the responsive means and in conjunction with pulses derived from the series of pulses for detecting the occurrence of pulses at all clock marker times between the first pulse and the last index marker pulse of the period, and further means coupled to the operable means comparing said information signals with said consecutive pulses in the interval after the first information pulse and signifying a departure from the consecutive pulse pattern between the first pulse and the last index marker pulse; instruction presenting means defining different signal processing operations; and, switching means operable from said instructions presented by said means for connecting said alarm indicator to a particular one of said signal processing channels involved in the current data processing operation.

11. In a computer apparatus employing a pulse code in which bits of information are indicated by the number of pulses contained in a unit time period, each of said unit time periods being comprised of the same predetermined number of unit pulse periods in which information may or may not occur, the variation in the number of information pulses in a unit time period comprising a coded information item containing pulses occurring in successive unit pulse periods thereby to form pulse groups of varying lengths for different information items, the groups of successive pulses in an information item including the last presented pulse period in the unit time period, means developing marker pulses marking the start of said unit time period, means developing timing pulses coincident with said unit pulse periods within the said unit time periods, an alarm conditioning bistable flip-flop responsive to said marker pulses to place it in a first stable condition and responsive to said information pulses to place said flip-flop in a second stable condition, said alarm conditioning bistable flip-flop emitting an output pulse when in said second stable condition, comparison means having an output terminal and a plurality of input terminals, said comparison means responsive to said timing pulses and said information pulses and capable of emitting pulses from said output terminal, a gating circuit having a plurality of input terminals and an output terminal, said gating circuit adapted to selectively emit a pulse upon its output terminal upon receipt of pulses upon its input terminals, an alarm indicator, a computer halt flip-flop, said alarm indicator and said computer halt flip-flop coupled to said output terminal of said gating circuit, and said gating circuit adapted to receive at said input terminal said timing pulses, said output pulses from said comparison circuit, and said output pulses from said alarm conditioning bistable flip-flop when said flip-flop is in its second stable condition.

References Cited in the file of this patent

UNITED STATES PATENTS

| | | |
|---|---|---|
| 2,512,038 | Potts | June 20, 1950 |
| 2,570,716 | Rochester | Oct. 9, 1951 |
| 2,589,465 | Weiner | Mar. 18, 1952 |
| 2,609,143 | Stibitz | Sept. 2, 1952 |
| 2,696,599 | Holbrook et al. | Dec. 7, 1954 |
| 2,756,409 | Lubkin | July 24, 1956 |
| 2,848,532 | Weida | Aug. 19, 1958 |
| 2,889,534 | Lubkin | June 2, 1959 |